(12) United States Patent
Wang

(10) Patent No.: US 9,133,970 B2
(45) Date of Patent: Sep. 15, 2015

(54) ATTACHMENT FOR DIFFERENT AIR VALVES

(71) Applicant: Beto Engineering & Marketing Co., Ltd., Taichung (TW)

(72) Inventor: Lo Pin Wang, Taichung (TW)

(73) Assignee: Beto Entineering & Marketing Co., Ltd., Beitun, Taichung (TW)

( * ) Notice: Subject to any disclaimer, the term of this patent is extended or adjusted under 35 U.S.C. 154(b) by 199 days.

(21) Appl. No.: 13/971,981

(22) Filed: Aug. 21, 2013

(65) Prior Publication Data

US 2015/0053280 A1  Feb. 26, 2015

(51) Int. Cl.
*F16K 15/20* (2006.01)
*F16L 37/28* (2006.01)
*F16K 1/04* (2006.01)
*F16K 3/26* (2006.01)

(52) U.S. Cl.
CPC . *F16L 37/28* (2013.01); *F16K 1/04* (2013.01); *F16K 3/262* (2013.01); *F16K 3/267* (2013.01); *Y10T 137/3724* (2015.04)

(58) Field of Classification Search
CPC ............ F16K 15/20; B60C 29/06; B60S 5/04
USPC .................................................. 137/223, 231
See application file for complete search history.

(56) References Cited

U.S. PATENT DOCUMENTS

| | | | |
|---|---|---|---|
| 5,645,100 A | 7/1997 | Chuang et al. | |
| 5,683,234 A | 11/1997 | Chuang et al. | |
| 5,819,781 A * | 10/1998 | Wu | 137/231 |
| 6,076,544 A * | 6/2000 | Pierce | 137/223 |
| 6,105,600 A * | 8/2000 | Wang | 137/231 |
| 6,289,920 B1* | 9/2001 | Wang | 137/223 |
| 7,866,335 B2* | 1/2011 | Wang | 137/231 |
| 2002/0074039 A1* | 6/2002 | Blom | 137/223 |
| 2012/0080099 A1* | 4/2012 | Wang | 137/223 |
| 2014/0261754 A1* | 9/2014 | Wang | 137/231 |

* cited by examiner

*Primary Examiner* — Kevin Murphy
*Assistant Examiner* — R. K. Arundale
(74) *Attorney, Agent, or Firm* — Charles E. Baxley

(57) ABSTRACT

An air valve connecting device or attachment includes a housing having an inlet barrel, a sliding member slidably engaged in the housing and having an upper portion extendible out of the housing, the sliding member includes a pathway for selectively aligning with the inlet barrel, a catching element is attached to the sliding member, a gasket is engaged in the catching element, and an inflation valve is engageable into the gasket for depressing the gasket and the catching element and the sliding member to engage into the housing and for moving the sliding member out of the housing, and the inflation valve is detachable from the housing by depressing the sliding member into the housing.

14 Claims, 4 Drawing Sheets

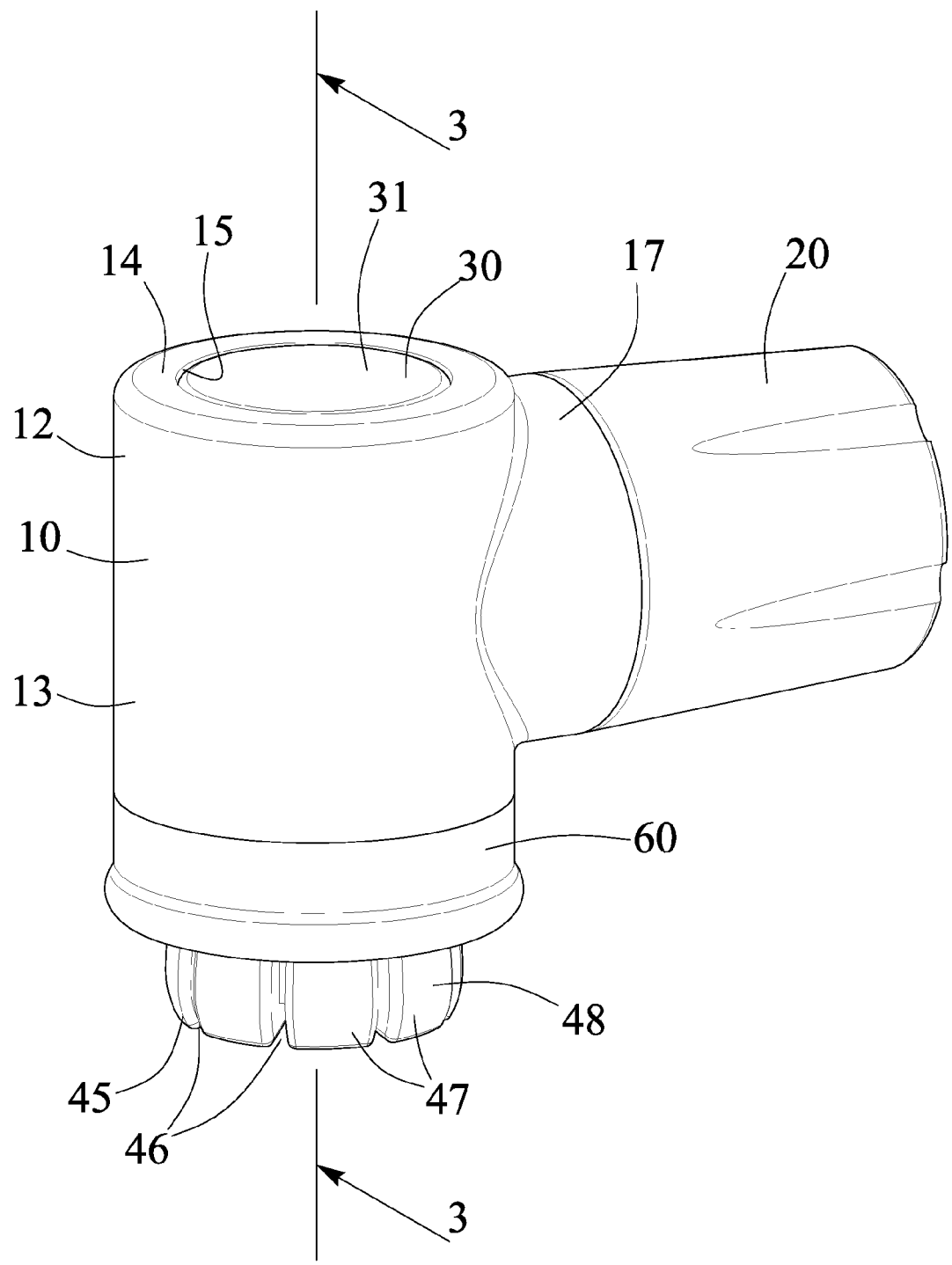
F I G. 2

ATTACHMENT FOR DIFFERENT AIR VALVES

The present invention is a continuation-in-part of U.S. patent application Ser. No. 13/802,908 filed 14 Mar. 2013, pending.

BACKGROUND OF THE INVENTION

1. Field of the Invention

The present invention relates to an air valve connecting head or device or attachment, and more particularly to an air valve connecting device or attachment including an improved structure for easily and quickly connecting to an inflation valve by the user and for preventing an air leaking from the inflation valve and the attachment.

2. Description of the Prior Art

Typical air valve connecting devices or attachments comprise one or more fitting ports or mouths formed or provided in a valve housing for receiving or engaging with inflation valves or nozzles and for selectively inflating various kinds of balls, inner tires of the bicycles or the motorcycles or the vehicles, or other inflatable articles.

For example, U.S. Pat. No. 5,683,234 to Chuang et al., and U.S. Pat. No. 5,645,100 to Chuang et al. disclose two of the typical hand operated, dual chambered, pneumatic pumps comprising a fitting member or attachment for selectively or alternatively engaging with different nozzles or tire valves, such as the U.S. type inflation valve or the French type inflation valve, or the like.

However, the typical air valve connecting heads or fittings comprise a structure that may occupy a great space or volume and that may not be easily operated or may not effectively grasping or holding the different inflation valves, and may have an air leaking problem occurred through either the inflation valve or the attachment.

U.S. Pat. No. 7,866,335 to Wang discloses another typical air valve connecting heads for the hand-held air pump and comprising a fitting device or attachment for selectively or alternatively engaging with different tire valves, such as the U.S. type inflation valve or the French type inflation valve, or the like.

However, the typical air valve connecting heads or attachments also comprise a structure that may not be easily operated by the user or may not effectively grasping or holding the different inflation valves, and may have an air leaking problem occurred through either the inflation valve or the attachment.

The present invention has arisen to mitigate and/or obviate the afore-described disadvantages of the conventional air valve connecting devices or attachments.

SUMMARY OF THE INVENTION

The primary objective of the present invention is to provide an air valve connecting device or attachment including an improved structure for easily and quickly connecting to an inflation valve by the user and for preventing an air leaking from the inflation valves and the attachment.

In accordance with one aspect of the invention, there is provided an air valve connecting device comprising a housing including a compartment formed therein, and including an inlet barrel having an entrance for receiving a pressurized air, a sliding member slidably received and engaged in the compartment of the housing, and including an upper portion extendible out of the housing, the sliding member including a pathway laterally formed therein for selectively aligning with the entrance of the inlet barrel and for selectively receiving the pressurized air from the inlet barrel, the sliding member including a lower portion, a catching element attached to the lower portion of the sliding member and moved in concert with the sliding member, the catching element including a chamber formed therein, a gasket engaged in the chamber of the catching element and including a bore formed in the gasket, and an inflation valve, such as a French type inflation valve or U.S. type inflation valve is engageable into the bore of the gasket for depressing and forcing the gasket and the catching element and the sliding member to engage into the compartment of the housing and for moving the upper portion of the sliding member out of the housing, and the inflation valve may be detached from the housing by depressing the upper portion of the sliding member into the housing.

The catching element includes an inclined outer peripheral surface, and the housing includes a sleeve attached to the housing, and the sleeve includes a radially and inwardly extended peripheral protrusion for selectively contacting and engaging with the inclined outer peripheral surface of the catching element and for selectively forcing the catching element to depress the gasket onto the inflation valve and to secure the inflation valve in the gasket and in the chamber of the catching element.

The catching element includes a radially and outwardly extended swelling for selectively contacting and engaging with the protrusion of the sleeve and for limiting the catching element and the sliding member to move relative to the housing and for preventing the catching element and the sliding member from being disengaged from the housing.

The catching element includes a radially and inwardly extended peripheral flange for selectively engaging with the gasket and the inflation valve and for anchoring the gasket and the inflation valve in the chamber of the catching element.

The catching element includes a peripheral wall for forming the chamber of the catching element, and includes a plurality of slots formed in the peripheral wall for forming a plurality of blades in the peripheral wall and for increasing a resilience of the peripheral wall of the catching element.

The gasket includes a radially and inwardly extended peripheral projection for selectively contacting and engaging with the inflation valve. The sliding member includes a tube provided in a lower portion of the sliding member for selectively contacting and engaging with the peripheral projection of the gasket.

The sliding member includes a mouth communicating with the pathway of the sliding member for selectively contacting and engaging with the inflation valve.

Another or spare or second sliding member may further be provided and slidably received and engaged in the compartment of the housing, and including an upper portion extendible out of the housing, the second sliding member including a pathway laterally formed therein for selectively aligning with the entrance of the inlet barrel and for selectively receiving the pressurized air from the inlet barrel, the second sliding member including a lower portion, the catching element being attached to the lower portion of the second sliding member and moved in concert with the second sliding member, a second gasket engaged in the chamber of the catching element and including a bore formed in the second gasket, and a second inflation valve, such as a U.S. type inflation valve or French type inflation valve is engageable into the bore of the second gasket for depressing and forcing the second gasket and the catching element and the second sliding member to engage into the compartment of the housing and for moving the upper portion of the second sliding member out of the housing, and the second inflation valve is detachable from the housing by depressing the upper portion of the second sliding member into the housing.

The catching element includes a radially and inwardly extended peripheral flange for selectively engaging with the second gasket and the second inflation valve and for anchoring the second gasket and the second inflation valve in the chamber of the catching element. The second gasket includes a radially and inwardly extended peripheral projection for selectively contacting and engaging with the second inflation valve.

The second sliding member includes a tube provided in a lower portion of the second sliding member for selectively contacting and engaging with the peripheral projection of the second gasket. The second sliding member includes a mouth communicating with the pathway of the second sliding member for selectively contacting and engaging with the second inflation valve.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a partial perspective view of the air valve connecting device or attachment;

DETAILED DESCRIPTION OF THE PREFERRED EMBODIMENT

Figure 1:
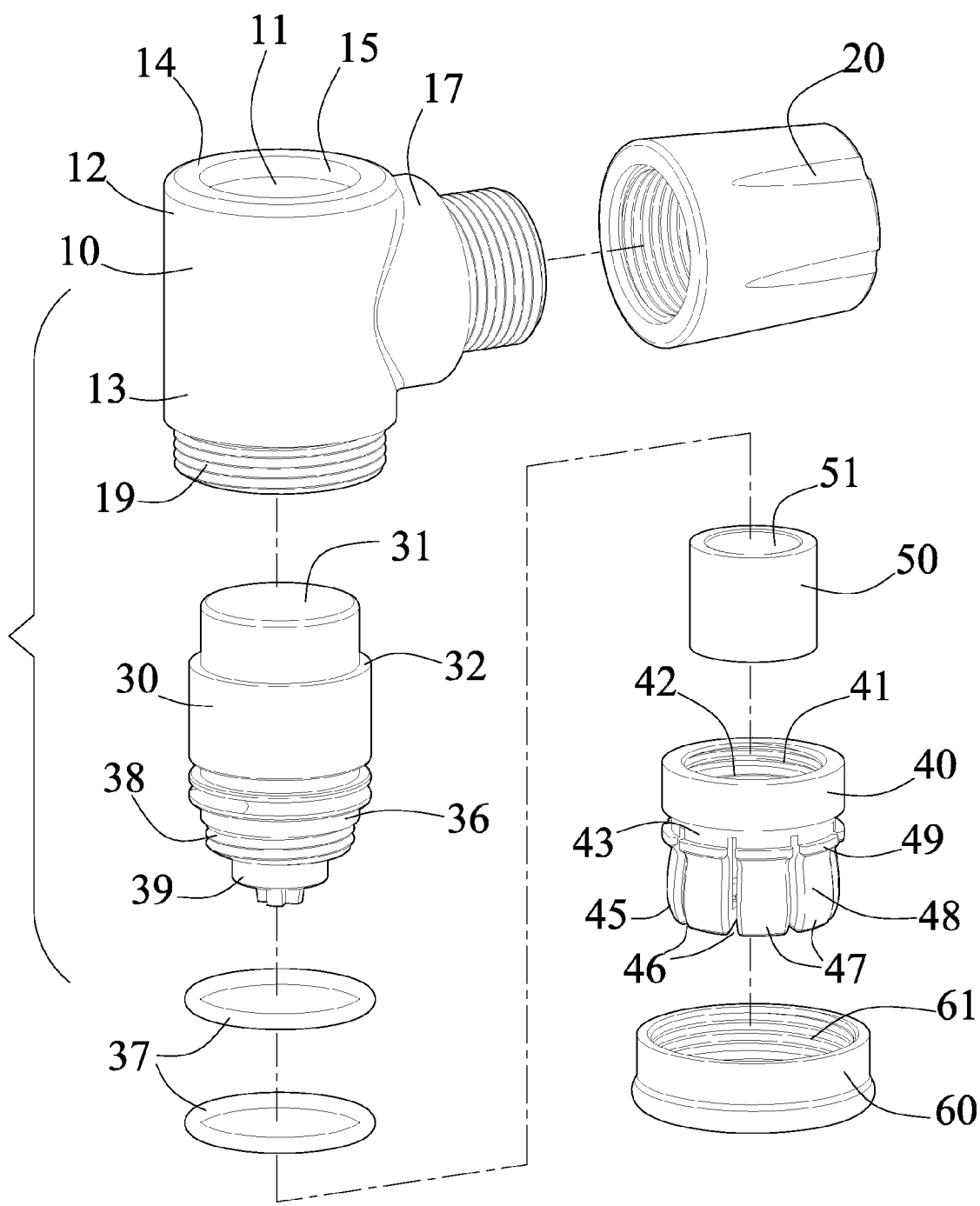
FIG. 1 is an exploded view of an air valve connecting device or attachment in accordance with the present invention.
Figure 3:
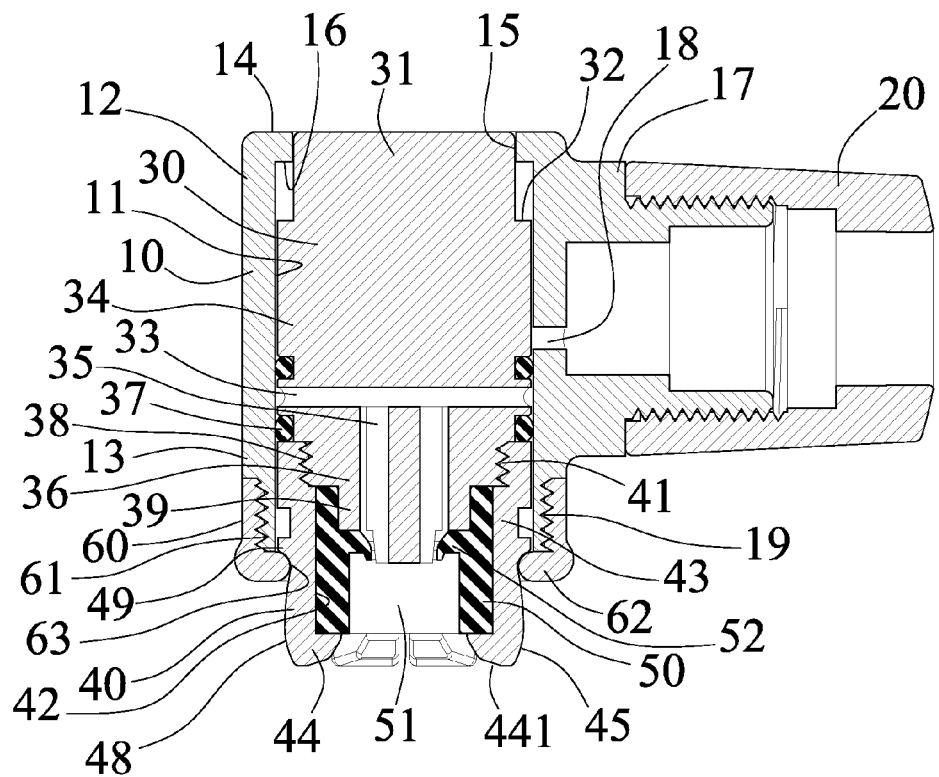
FIG. 3 is a cross sectional view of the air valve connecting device or attachment taken along lines 3-3 of FIG. 2.

Referring to the drawings, and initially to FIGS. 1-3, an air valve connecting device or attachment in accordance with the present invention comprises a head body or housing 10 including a compartment 11 formed therein and opened upwardly through an upper portion 12 of the housing 10 and also opened downwardly through a lower or bottom portion 13 of the housing 10 (FIGS. 3, 4), the housing 10 includes a positioning or retaining or anchoring portion or device or member 14 extended radially and inwardly therefrom, such as extended radially and inwardly from the upper portion 12 of the housing 10 for forming or defining a relatively decreased or reduced entrance or passage or orifice 15 and/or an inner peripheral depression or recess or shoulder 16 in the upper portion 12 of the housing 10 and communicating with the compartment 11 of the housing 10.

The housing 10 further includes a stud or extension or inlet barrel 17 extended laterally and outwardly therefrom for connecting or coupling to a pressurized air reservoir or hand-held air pump (not illustrated) or the like with such as hoses (not illustrated) and a control ferrule 20 or the like for receiving the pressurized air from the air reservoir or hand-held air pump (not illustrated) or the like, and includes a lateral orifice or entrance 18 formed therein, such as formed in or through the inlet barrel 17 of the housing 10 and communicating with the compartment 11 of the housing 10 for guiding the pressurized air to flow into the compartment 11 of the housing 10. The above-described structure or configuration for the connection mechanism or status between the inlet barrel 17 and the air reservoir or hand-held air pump (not illustrated) is typical and is not related to the present invention and will not be described in further details.

The air valve connecting device or attachment further includes a valve piece or shank or sliding member 30 slidably or movably disposed or engaged into the compartment 11 of the housing 10, and the sliding member 30 includes an upper portion 31 selectively extendible out of the housing 10 (FIGS. 4, 6), and includes another positioning or retaining or anchoring portion or device or member 32, such as an outer peripheral shoulder 32 formed therein, such as formed in the upper portion 31 of the sliding member 30 for selectively contacting or engaging with the anchoring member 14 and/or the inner peripheral shoulder 16 of the housing 10 and for guiding and limiting the sliding member 30 to slide or move relative to the housing 10 and for preventing the sliding member 30 from being disengaged or removed or separated from the housing 10 inadvertently.

Figure 4:
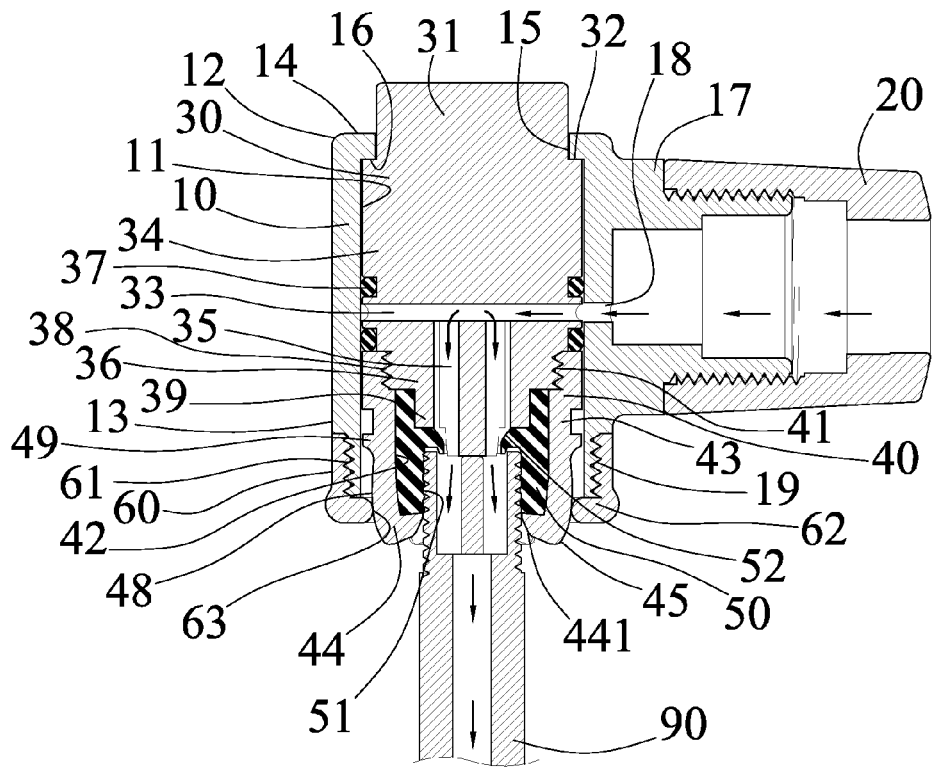
FIG. 4 is another cross sectional view similar to FIG. 3, illustrating the operation of the air valve connecting device or attachment.
Figure 6:
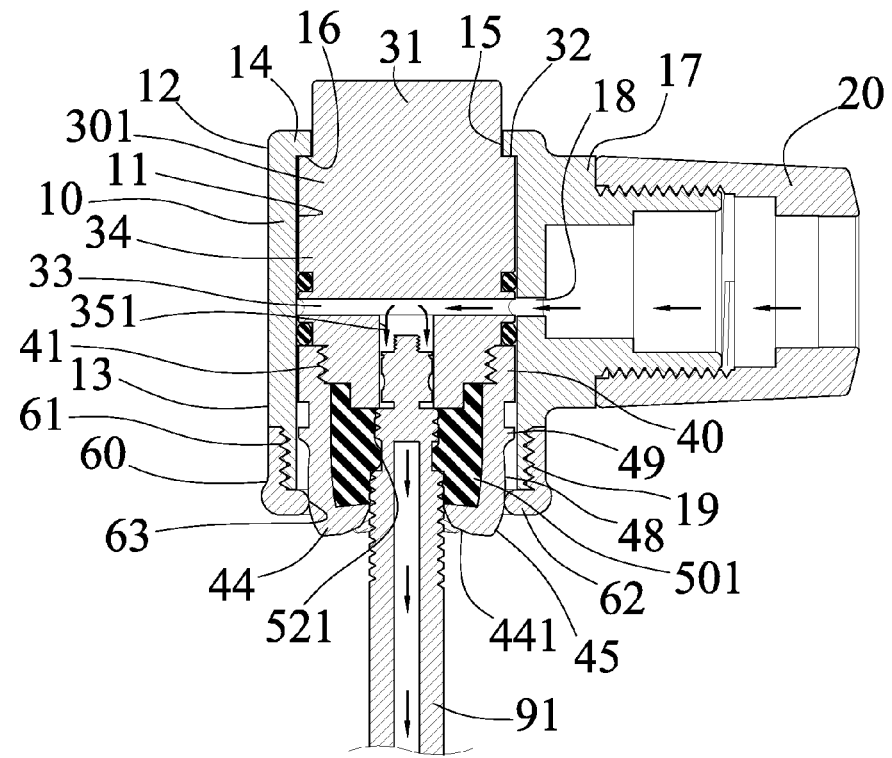
FIG. 6 is a still further cross sectional view similar to FIG. 5, illustrating the operation of the air valve connecting device or attachment as shown in FIG. 5.

The sliding member 30 includes a passage or orifice or opening or conduit or pathway 33 laterally formed in the middle or intermediate portion 34 of the sliding member 30 for selectively aligning with or engaging with or communicating with the entrance 18 of the inlet barrel 17, best shown in FIGS. 4 and 6, and for selectively receiving the pressurized air from the air reservoir or hand-held air pump (not illustrated) or the like; and includes an opening or mouth 35 formed therein, such as formed in the lower portion 36 of the sliding member 30 and communicating with the pathway 33 of the sliding member 30 for allowing the pressurized air to selectively flow from the pathway 33 to the mouth 35 of the sliding member 30 (FIG. 4) when the pathway 33 of the sliding member 30 is selectively aligned with or communicating with the entrance 18 of the inlet barrel 17 or of the housing 10.

The air valve connecting device or attachment further includes one or more (such as two) sealing rings 37 attached or mounted or secured or engaged onto the sliding member 30, and contacted or engaged between the sliding member 30 and the housing 10 for selectively making a water or air tight seal between the sliding member 30 and the housing 10, for example, one of the sealing rings 37 is disposed or located above the pathway 33 of the sliding member 30, and another sealing ring 37 is disposed or located below the pathway 33 of the sliding member 30 for preventing the pressurized air from leaking out through the adjacent or contact portion between the sliding member 30 and the housing 10. The sliding member 30 includes an outer thread 38 and a relatively decreased or reduced ring or conduit or cylindrical member or tube 39 formed or provided in the lower portion 36 of the sliding member 30. The mouth 35 is formed through the lower portion 36 and the tube 39 of the sliding member 30 for receiving or engaging with an inflation valve 90 (FIG. 4), such as the French type valve or the U.S. type or first inflation valve 90 or the like.

An anchoring or retaining or chuck or grasping or gripping or catching device or element 40 includes an inner thread 41 formed or provided therein for threading or engaging with the outer thread 38 of the sliding member 30 and for detachably or changeably or selectively attached or mounted or secured or coupled to the lower portion 36 of the sliding member 30 and moved in concert with the sliding member 30. The catching device or element 40 includes a chamber 42 formed therein and formed or defined by a peripheral fence or wall 43, and includes a peripheral flange 44 extended radially and inwardly from the lower or bottom portion 45 of the catching element 40 for partially forming or defining the chamber 42 of the catching element 40, and includes one or more slits or slots 46 formed in the peripheral wall 43 for forming or defining two or more elastic or resilient or spring blades 47 in the peripheral wall 43 and for increasing the resilience of the peripheral wall 43 of the catching element 40.

An elastic grasping member or mouth or gasket 50 is attached or mounted or secured or received or contained or engaged in the chamber 42 of the catching element 40, and anchored or retained or positioned between the peripheral flange 44 of the catching element 40 and the lower portion 36 of the sliding member 30, and includes a bore 51 formed therein and having a predetermined size or dimension or standard for receiving or engaging with the inflation valve 90 (FIG. 4), and the gasket 50 is made of soft or elastic materials, such as rubber, plastic or other synthetic materials having a suitable or predetermined softness or resilience for being selectively depressed or compressed or squeezed or deformed to grip or grasp or hold or retain the inflation valve 90 to the catching element 40 and the sliding member 30.

As shown in FIG. 4, the peripheral flange 44 of the catching element 40 is extended radially and inwardly from the lower or bottom portion 45 of the catching element 40 for selectively engaging with the gasket 50 and/or the inflation valve 90 and for solidly and stably anchoring or securing or retaining or positioning or confining the gasket 50 and/or the inflation valve 90 in the chamber 42 of the catching element 40, and for preventing the gasket 50 and/or the inflation valve 90 from being disengaged or separated from the catching element 40 and the sliding member 30. The tube 39 of the sliding member 30 is engaged into the bore 51 of the gasket 50, and the gasket 50 is contacted or engaged with the lower portion 36 of the sliding member 30, and the gasket 50 includes an inner peripheral projection 52 extended radially and inwardly therefrom for selectively contacting or engaging with the tube 39 of the sliding member 30 and/or for engaging with the inflation valve 90.

A control ferrule or barrel or sleeve 60 includes an inner thread 61 formed or provided therein for threading or engaging with the outer thread 19 that is formed in the lower or bottom portion 13 of the housing 10 and for detachably or changeably or selectively attached or mounted or secured or coupled to the lower or bottom portion 13 of the housing 10, and includes a peripheral flange or projection or bulge or swelling or protrusion 62 extended radially and inwardly therefrom for forming or defining a relatively decreased or reduced entrance or orifice or passage or aperture 63 therein and for selectively contacting or engaging with the peripheral wall 43 of the catching element 40. The peripheral wall 43 of the catching element 40 further includes a tilted or inclined outer peripheral portion or surface 48 formed or provided on the outer peripheral portion of the catching element 40.

In operation, as shown in FIGS. 3 and 4, the protrusion 62 of the sleeve 60 is contacted or engaged with the tilted or inclined outer peripheral surface 48 of the catching element 40 for selectively depressing or compressing or forcing or squeezing the spring blades 47 of the outer peripheral wall 43 of the catching element 40 to move radially and inwardly to engage with and to depress the gasket 50 onto the inflation valve 90 (FIG. 4), and thus to solidly and stably anchor or retain or position or secure the inflation valve 90 in the gasket 50 and in the chamber 42 of the catching element 40 when the inflation valve 90 is engaged into the bore 51 of the gasket 50 and when the gasket 50 and the catching element 40 are depressed or forced to engage into the compartment 11 of the housing 10.

It is preferable, but not necessary that the catching element 40 includes a peripheral flange or projection or protrusion or bulge or swelling 49 extended radially and outwardly therefrom for selectively contacting or engaging with the protrusion 62 of the sleeve 60 (FIGS. 3 and 5) and for guiding and limiting the catching element 40 and the sliding member 30 to slide or move relative to the housing 10 and for preventing the catching element 40 and the sliding member 30 from being disengaged or removed or separated from the housing 10 inadvertently. The catching element 40 may further include a tilted or inclined guiding surface 441 formed or provided in the lower or bottom portion of the peripheral flange 44 of the catching element 40 for guiding the inflation valve 90 to engage into the bore 51 of the gasket 50.

In operation, as shown in FIG. 3, the lower or bottom portion 45 of the catching element 40 may be depressed or compressed or forced to move out of the housing 10 and the sleeve 60 for allowing the inflation valve 90 to be engaged into the bore 51 of the gasket 50, and the gasket 50 and the catching element 40 and the sliding member 30 may then be depressed or forced to engage into the compartment 11 of the housing 10 (FIG. 4), and the upper portion 31 of the sliding member 30 may then be forced to move or extend out of the housing 10, the protrusion 62 of the sleeve 60 may be engaged with the tilted or inclined outer peripheral surface 48 of the catching element 40 for forcing the spring blades 47 of the outer peripheral wall 43 of the catching element 40 to move inwardly to engage with and to depress the gasket 50 onto the inflation valve 90, and thus to secure the inflation valve 90 in the gasket 50 and in the chamber 42 of the catching element 40. The inflation valve 90 may be removed or detached or disengaged or separated from the housing 10 by depressing the upper portion 31 of the sliding member 30 into the housing 10.

Figure 5:
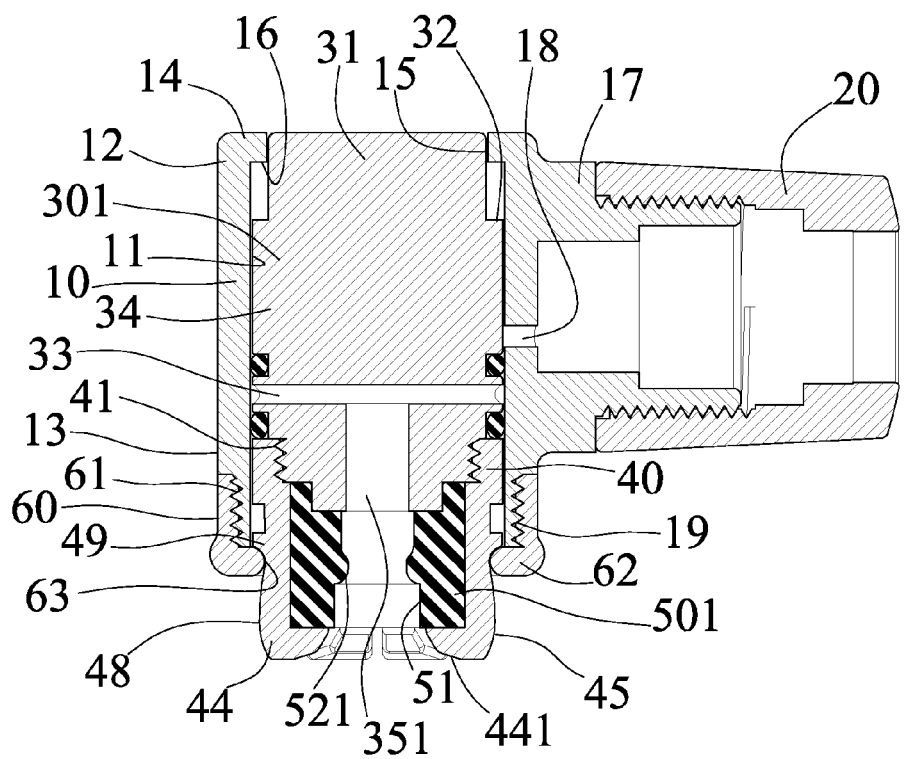
FIG. 5 is a further cross sectional view similar to FIGS. 3 and 4, illustrating the other arrangement of the air valve connecting device or attachment.

As shown in FIGS. 5 and 6, the air valve connecting device or attachment in accordance with the present invention may further comprise another or second or spare valve piece or shank or sliding member 301 detachably or changeably or selectively disposed or engaged into the compartment 11 of the housing 10 and slidable or movable relative to the housing 10, and the second or spare sliding member 301 includes an opening or mouth 351 formed therein and having a shape or size or standard or structure or configuration different from that shown in FIGS. 3 and 4, for selectively receiving or engaging with another inflation valve 91 (FIG. 6), such as the U.S. type valve or the French type or second inflation valve 91 or the like; and the second or spare gasket 501 includes an inner peripheral projection 521 different from that shown in FIGS. 3 and 4, for selectively contacting or engaging with the second inflation valve 91 (FIG. 6).

In operation, as shown in FIG. 5, the lower or bottom portion 45 of the catching element 40 may also be depressed or compressed or forced to move out of the housing 10 and the sleeve 60 by depressing the upper portion 31 of the sliding member 301 into the housing 10 for allowing the second inflation valve 91 to be engaged into the bore 51 of the gasket 501, and the gasket 501 and the catching element 40 and the sliding member 301 may then be depressed or forced to engage into the compartment 11 of the housing 10 (FIG. 6), and the upper portion 31 of the sliding member 301 may then be forced to move or extend out of the housing 10, the protrusion 62 of the sleeve 60 may be engaged with the tilted or inclined outer peripheral surface 48 of the catching element 40 for forcing the spring blades 47 of the outer peripheral wall 43 of the catching element 40 to move inwardly to engage with and to depress the gasket 501 onto the inflation valve 91, and thus to secure the inflation valve 91 in the gasket 501 and in the chamber 42 of the catching element 40.

Accordingly, the air valve connecting device or attachment in accordance with the invention includes an improved structure for easily and quickly connecting an inflation valve by the user and for preventing an air leaking from the inflation valves and the attachment, and includes different sliding members and different gaskets for engaging with different inflation valves.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An air valve connecting device comprising:
    a housing including a compartment formed therein, and including an inlet barrel having an entrance for receiving a pressurized air,
    a sliding member slidably received and engaged in said compartment of said housing, and including an upper portion extendible out of said housing, said sliding member including a pathway laterally formed therein for selectively aligning with said entrance of said inlet barrel and for selectively receiving the pressurized air from said inlet barrel, said sliding member including a lower portion,
    a catching element attached to said lower portion of said sliding member and moved in concert with said sliding member, said catching element including a chamber formed therein,
    a gasket engaged in said chamber of said catching element and including a bore formed in said gasket, and
    an inflation valve engageable into said bore of said gasket for depressing and forcing said gasket and said catching element and said sliding member to engage into said compartment of said housing and for moving said upper portion of said sliding member out of said housing, and
    said inflation valve being detachable from said housing by depressing said upper portion of said sliding member into said housing.

2. The air valve connecting device as claimed in claim 1, wherein said catching element includes an inclined outer peripheral surface, and said housing includes a sleeve attached to said housing, and said sleeve includes a radially and inwardly extended peripheral protrusion for selectively contacting and engaging with said inclined outer peripheral surface of said catching element and for selectively forcing said catching element to depress said gasket onto said inflation valve and to secure said inflation valve in said gasket and in said chamber of said catching element.

3. The air valve connecting device as claimed in claim 2, wherein said catching element includes a radially and outwardly extended swelling for selectively contacting and engaging with said protrusion of said sleeve and for limiting said catching element and said sliding member to move relative to said housing and for preventing said catching element and said sliding member from being disengaged from said housing.

4. The air valve connecting device as claimed in claim 1, wherein said catching element includes a radially and inwardly extended peripheral flange for selectively engaging with said gasket and said inflation valve and for anchoring said gasket and said inflation valve in said chamber of said catching element.

5. The air valve connecting device as claimed in claim 1, wherein said catching element includes a peripheral wall for forming said chamber of said catching element, and includes a plurality of slots formed in said peripheral wall for forming a plurality of blades in said peripheral wall and for increasing a resilience of said peripheral wall of said catching element.

6. The air valve connecting device as claimed in claim 1, wherein said gasket includes a radially and inwardly extended peripheral projection for selectively contacting and engaging with said inflation valve.

7. The air valve connecting device as claimed in claim 6, wherein said sliding member includes a tube provided in a lower portion of said sliding member for selectively contacting and engaging with said peripheral projection of said gasket.

8. The air valve connecting device as claimed in claim 1, wherein said sliding member includes a mouth communicating with said pathway of said sliding member for selectively contacting and engaging with said inflation valve.

9. The air valve connecting device as claimed in claim 1, wherein said sliding member includes a first anchoring member, and said housing includes a second anchoring member for engaging with said first anchoring member of said sliding member and for limiting said sliding member to slide relative to said housing.

10. The air valve connecting device as claimed in claim 1 further comprising a second sliding member slidably received and engaged in said compartment of said housing, and including an upper portion extendible out of said housing, said second sliding member including a pathway laterally formed therein for selectively aligning with said entrance of said inlet barrel and for selectively receiving the pressurized air from said inlet barrel, said second sliding member including a lower portion, said catching element being attached to said lower portion of said second sliding member and moved in concert with said second sliding member, a second gasket engaged in said chamber of said catching element and including a bore formed in said second gasket, and a second inflation valve engageable into said bore of said second gasket for depressing and forcing said second gasket and said catching element and said second sliding member to engage into said compartment of said housing and for moving said upper portion of said second sliding member out of said housing, and said second inflation valve being detachable from said housing by depressing said upper portion of said second sliding member into said housing.

11. The air valve connecting device as claimed in claim 10, wherein said catching element includes a radially and inwardly extended peripheral flange for selectively engaging with said second gasket and said second inflation valve and for anchoring said second gasket and said second inflation valve in said chamber of said catching element.

12. The air valve connecting device as claimed in claim 10, wherein said second gasket includes a radially and inwardly extended peripheral projection for selectively contacting and engaging with said second inflation valve.

13. The air valve connecting device as claimed in claim 12, wherein said second sliding member includes a tube provided in a lower portion of said second sliding member for selectively contacting and engaging with said peripheral projection of said second gasket.

14. The air valve connecting device as claimed in claim 10, wherein said second sliding member includes a mouth communicating with said pathway of said second sliding member for selectively contacting and engaging with said second inflation valve.

* * * * *